(12) United States Patent
Converso et al.

(10) Patent No.: US 11,970,057 B2
(45) Date of Patent: Apr. 30, 2024

(54) CLOSING SYSTEM FOR VEHICLE SUPPLY SYSTEM

(71) Applicant: ITALDESIGN-GIUGIARO S.P.A., Turin (IT)

(72) Inventors: Davide Converso, Rivoli (IT); Fabrizio Giacometti, San Carlo Canavese (IT); Alberto Caviolo, Castiglione Torinese (IT)

(73) Assignee: ITALDESIGN-GIUGIARO S.P.A., Turin (IT)

( * ) Notice: Subject to any disclaimer, the term of this patent is extended or adjusted under 35 U.S.C. 154(b) by 240 days.

(21) Appl. No.: 17/762,405

(22) PCT Filed: Sep. 4, 2020

(86) PCT No.: PCT/IB2020/058230
§ 371 (c)(1),
(2) Date: Mar. 22, 2022

(87) PCT Pub. No.: WO2021/064492
PCT Pub. Date: Apr. 8, 2021

(65) Prior Publication Data
US 2023/0339310 A1 Oct. 26, 2023

(30) Foreign Application Priority Data
Sep. 30, 2019 (IT) .................. 102019000017525

(51) Int. Cl.
*B60K 15/04* (2006.01)
(52) U.S. Cl.
CPC .. *B60K 15/0406* (2013.01); *B60K 2015/0425* (2013.01); *B60K 2015/0451* (2013.01)
(58) Field of Classification Search
CPC ................ B60K 15/04; B60K 15/0406; B60K 2015/0425; B60K 2015/0451
See application file for complete search history.

(56) References Cited

U.S. PATENT DOCUMENTS 7,461,673 B2 *  12/2008  Busch ............... B60K 15/0406
                                                           220/822
7,819,728 B2 *  10/2010  Beckley ................ B60N 3/106
                                                           220/822

(Continued)

FOREIGN PATENT DOCUMENTS

| GB | 380870 A | 9/1932 | |
| JP | 2017007542 A | 1/2017 | |
| JP | 2017007542 A | * 1/2017 | ............. B60K 15/05 |

OTHER PUBLICATIONS

International Search Report, issued in PCT/IB2020/058230, dated Oct. 15, 2020, Rijswijk, NL.

*Primary Examiner* — Nicolas A Arnett
(74) *Attorney, Agent, or Firm* — ArentFox Schiff LLP; Michael Fainberg (57) ABSTRACT

A closing system is provided which includes a frame adapted to be mounted on a vehicle supply system, the frame being shaped as a spherical segment and extending between a first circular section and a second circular section. The frame has a plurality of first and second guides, arranged on a radially outer surface. The closing system has a plurality of curved panels, each curved panel being shaped as a spherical cap portion and constrained at a first end and a second end thereof to slide, respectively, along a first guide and a second guide between a first position, in which the curved panels jointly define an opening that allows access to the vehicle supply system, and a second position, in which the curved panels prevent access to the supply system. Control means control movement of the curved panels between the first and second positions.

12 Claims, 6 Drawing Sheets

(56) References Cited

U.S. PATENT DOCUMENTS

| | | | |
|---|---|---|---|
| 8,430,140 B2* | 4/2013 | Ognjanovski | B60K 15/0406 251/212 |
| 8,677,690 B2* | 3/2014 | Lee | E05B 83/34 49/324 |
| 9,434,249 B2* | 9/2016 | Park | B60K 15/05 |
| 10,000,116 B2* | 6/2018 | Sasaki | F16K 1/2021 |
| 2009/0126827 A1* | 5/2009 | Guendouz | B60K 15/05 141/312 |
| 2011/0132905 A1* | 6/2011 | Ognjanovski | B60K 15/0406 141/350 |
| 2016/0068064 A1* | 3/2016 | Park | B60K 15/05 296/97.22 |

* cited by examiner

CLOSING SYSTEM FOR VEHICLE SUPPLY SYSTEM

CROSS-REFERENCE TO RELATED APPLICATIONS

This application is a National Phase Application of PCT International Application No. PCT/IB2020/058230, having an International Filing Date of Sep. 4, 2020 which claims priority to Italian Application No. 102019000017525 filed Sep. 30, 2019, each of which is hereby incorporated by reference in its entirety.

FIELD OF THE INVENTION

This invention generally relates to a closing system for a vehicle supply system. In particular, the invention relates to a closing system for a supply system having a diaphragm closure mechanism.

BACKGROUND OF THE INVENTION

A closing system for a supply system, in particular for a fuel filler pipe, having a diaphragm closure mechanism is known, for example, from U.S. Pat. No. 8,430,140, in the name of Ford Global Technologies LCC. This document shows a closing system for a fuel filler pipe adapted to seal a fuel filler pipe without a cap, by means of a diaphragm mechanism: a plurality of flat panels is moved on a radial plane between an open position wherein said flat panels jointly define an opening that allows access to said filler pipe and a closed position wherein access to said filler pipe is prevented and a seal is made. However, this closing system is rather cumbersome on the panel movement plane: in effect, on this plane, around the closing system, it is necessary to dedicate a space that the panels may occupy when they are in the open position.

Further closing systems are shown, for example, in the prior documents US 2016/068064 A1, JP 2017/007542 A, GB 380 870 A and U.S. Pat. No. 10,000,116 B2, but without the cited drawbacks being easily resolved.

SUMMARY OF THE INVENTION

An object of this invention is to provide a closing system for a vehicle supply system which does not suffer from the drawbacks of the prior art and which is more compact.

This and other objects are fully achieved by a closing system as described and claimed herein.

Advantageous embodiments of the present invention are also described.

In short, the invention is based on the idea of providing a closing system adapted to allow or limit access to a supply system of a vehicle, the closing system comprising:

- a frame, adapted to be mounted on a vehicle body in correspondence with the supply system, having an essentially spherical segment shape, extending between a first circular section and a second circular section and having a plurality of first guides and a plurality of second guides, arranged on the radially outer surface thereof;
- a plurality of curved panels, each essentially shaped as a part of a spherical cap, each panel being constrained at a first end thereof to slide along a respective first guide of said plurality of first guides and at a second end thereof to slide along a respective second guide of said plurality of second guides between a first position, wherein said panels jointly define an opening that allows access to said supply system, and a second position, wherein said panels prevent access to the supply system; and
- control means adapted to control the movement of said plurality of panels between said first and said second positions.

Preferably, moreover, said control means comprise an electric motor.

Advantageously, moreover, each of said first guides and each of said second guides extend on the outer surface of the frame, respectively, along an arc of a circle concentric to said second circular section and along a substantially rounded L shape.

By virtue of the configuration of such a closing system, the overall dimensions of the system are reduced with respect to the prior art.

BRIEF DESCRIPTION OF THE DRAWINGS

Further features and advantages of this invention will become clearer from the detailed description that follows, given purely by way of non-limiting example with reference to the accompanying drawings, wherein.

DETAILED DESCRIPTION

With reference to the figures, the closing system according to the invention is generally indicated at 10, and the vehicle supply system is generally indicated at T.

The supply system T may be of any type, and may for example comprise a refueling line for the introduction of liquid fuel, such as diesel, petrol or LPG fuel, or for the introduction into the vehicle's tank of a gaseous fuel, such as methane. The refueling line may therefore be arranged both for the passage of a fluid fuel under pressure and for the passage of a non-pressurized fuel. Lastly, the supply system T may also comprise, or consist of, an electrical connector for example for charging a vehicle battery, in particular in the case of hybrid-powered (i.e., having both a combustion engine and an electric motor) or purely electric vehicles. It being understood that the supply system T may be provided as just explained, in the following description the invention will be described with reference to a supply system comprising a liquid refueling line. In effect, in the embodiment shown in the figures, the supply system T is provided as a conventional line for the introduction of liquid fuel, having, at least in correspondence with one of its ends for introducing the fuel T1, a cylindrical tubular shape, and a cap C associated therewith and adapted to seal the refueling line tightly.

The closing system 10 essentially comprises a frame 12, a plurality of curved panels 14, and control means 16.

The frame 12 is adapted to be mounted on the body Z at the supply system T: therefore, in the illustrated example, it is adapted to be mounted on the refueling line, and in particular on its fuel introduction end T1, for example through a plurality of support plates 18 and conventional threaded mechanical connection means (such as screws and bolts). Preferably, the refueling line is also supported in position by the same support plates 18, fixed by means of threaded mechanical connection means.

The frame 12 has the shape of a spherical segment, i.e., the shape of a portion of spherical surface which extends between two parallel planes intersecting the sphere to which said spherical surface belongs. Clearly, as is clear and evident to a person skilled in the art, an only slightly different shape, such as that of a spheroid or an ellipsoid, or an imprecise or deformed spherical surface, is included in the scope of the invention. In particular, the frame 12 extends between a first circular section 20 and a second circular section 22. Said first circular section 20 and said second circular section 22 are coaxial, i.e., the straight line passing through the centers of the circumferences which define these circular sections is perpendicular to both planes on which these circumferences lie. The frame 12 is arranged so as to surround the refueling line, i.e., so that the first circular section 20 and the second circular section 22 are coaxial with the refueling line, and so that the fuel introduction end T1 is between the first circular section 20 and the second circular section 22 of the frame 12.

On the second circular section 22, the frame 12 is provided with a flange 24, adapted to allow, in a manner known per se, the mechanical connection of the frame 12 to the support plates 18, and therefore to the body Z.

A plurality of first guides 28 and a plurality of second guides 30 are arranged on the frame 12, in particular on a radially outer surface 26 thereof, in a number equal to the number of panels 14; for example, in the embodiment shown in the figures, the closing system 10 comprises four first guides 28, four second guides 30 and four panels 14. Clearly, it is also possible to use a different number of guides and panels, for example constructing the closing system 10 according to the invention with six first guides 28, six second guides 30 and six curved panels 14.

Both the first guides 28 of the plurality of first guides 28 and the second guides 30 of the plurality of second guides 30 are arranged angularly evenly spaced from each other on the outer surface 26 of the frame 12. Each of said first guides 28 extends on the outer surface 26 of the frame 12 along an arc that is part of a circle concentric to said first and said second circular section 20 and 22, or a circular arc the center of which is on the same straight line, or axis, on which the centers of the first and second circular sections 20 and 22 lie. Each of said second guides 30, on the other hand, extends on the outer surface 26 of the frame 12 with a substantially rounded L shape.

Figure 1:
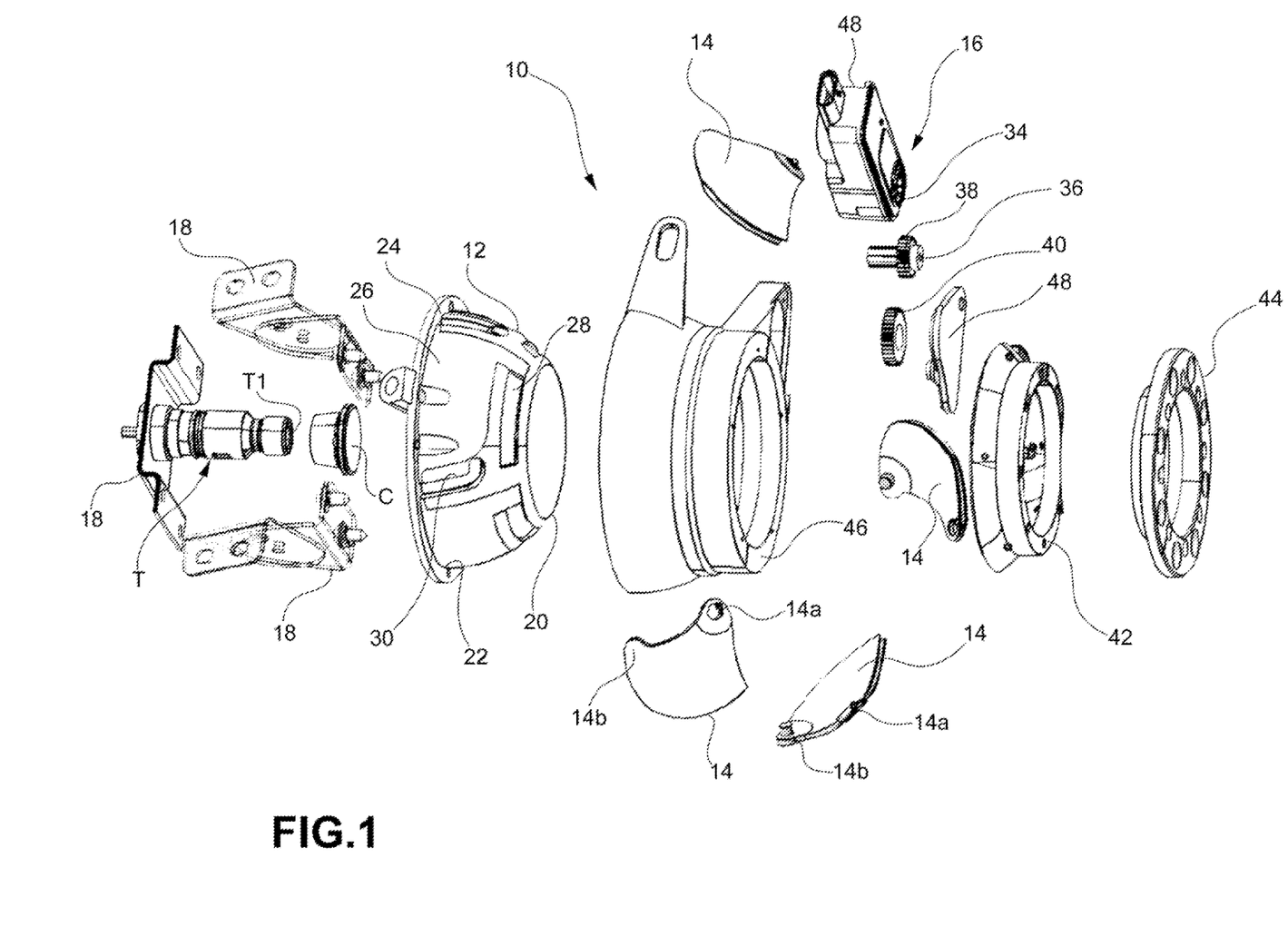
FIG. 1 is an exploded view of the closing system according to an embodiment of the invention.
Figure 2:
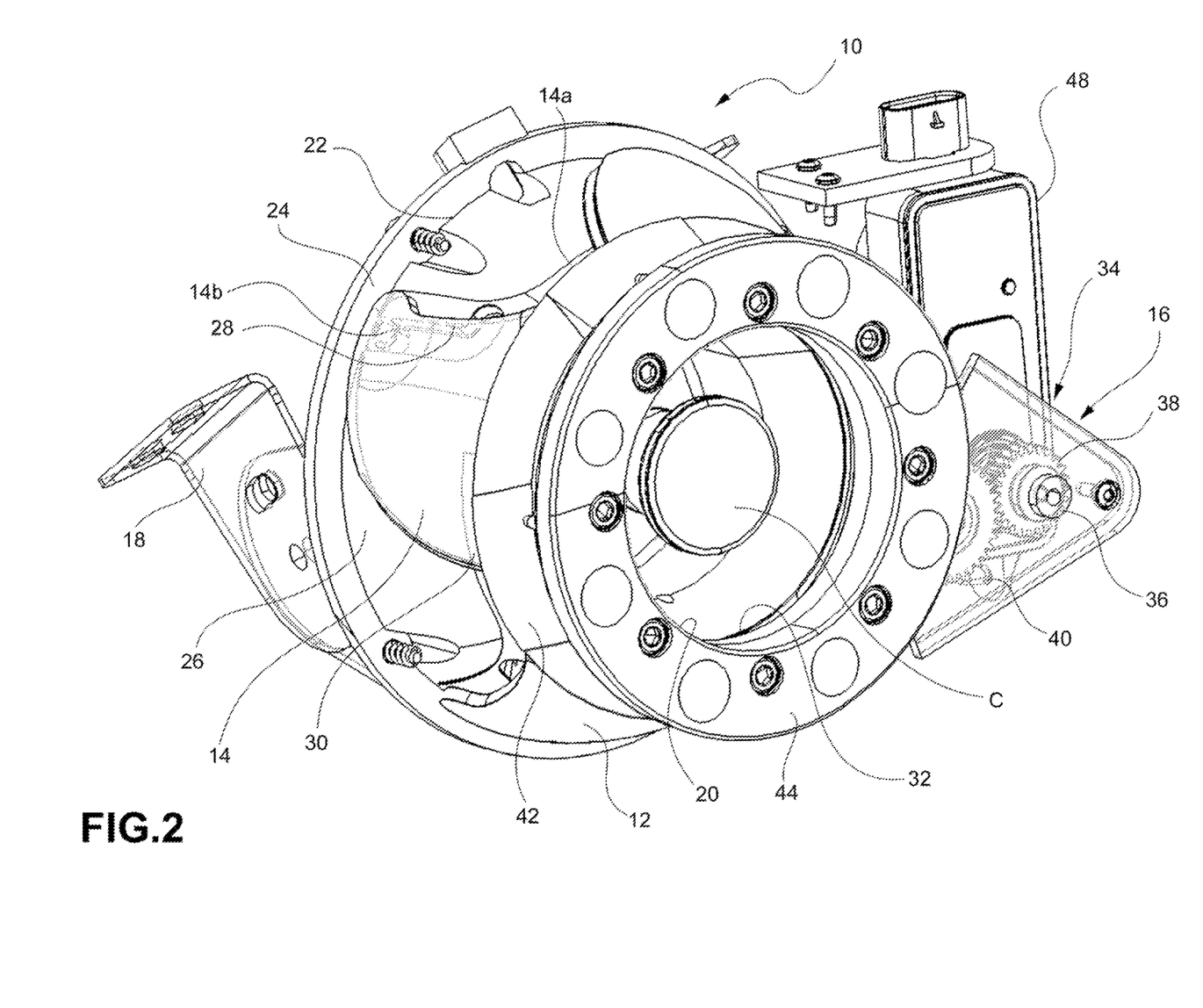
FIGS. 2, 3, 4 and 5 are perspective views of the closing system in FIG. 1 (in which one of the panels is shown in transparency for clarity), respectively, in four successive moments of closure, starting from a completely open position shown in FIG. 2 until reaching a completely closed position shown in FIG. 5, passing through the intermediate positions shown in FIGS. 3 and 4.
Figure 3:
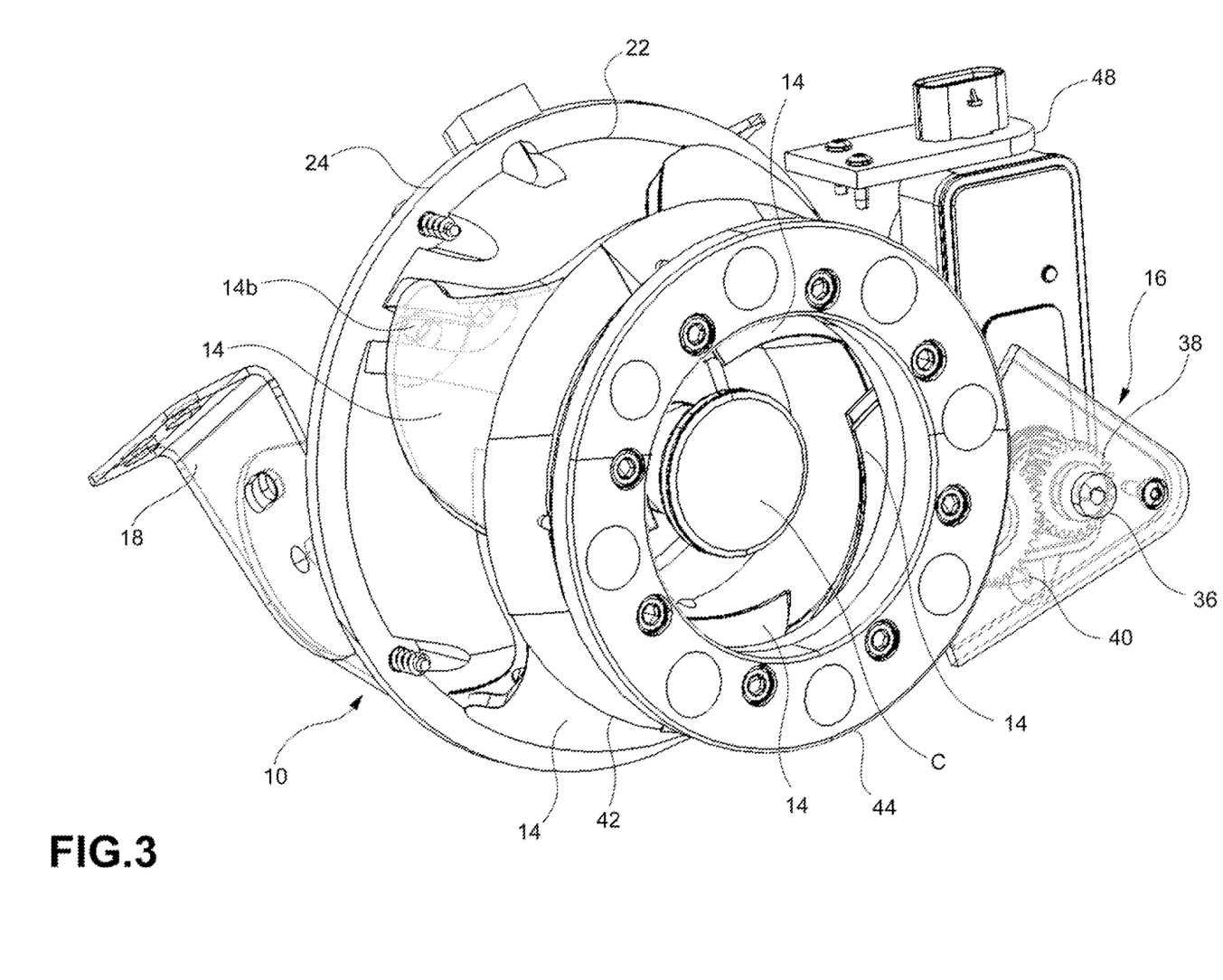
Figure 4:
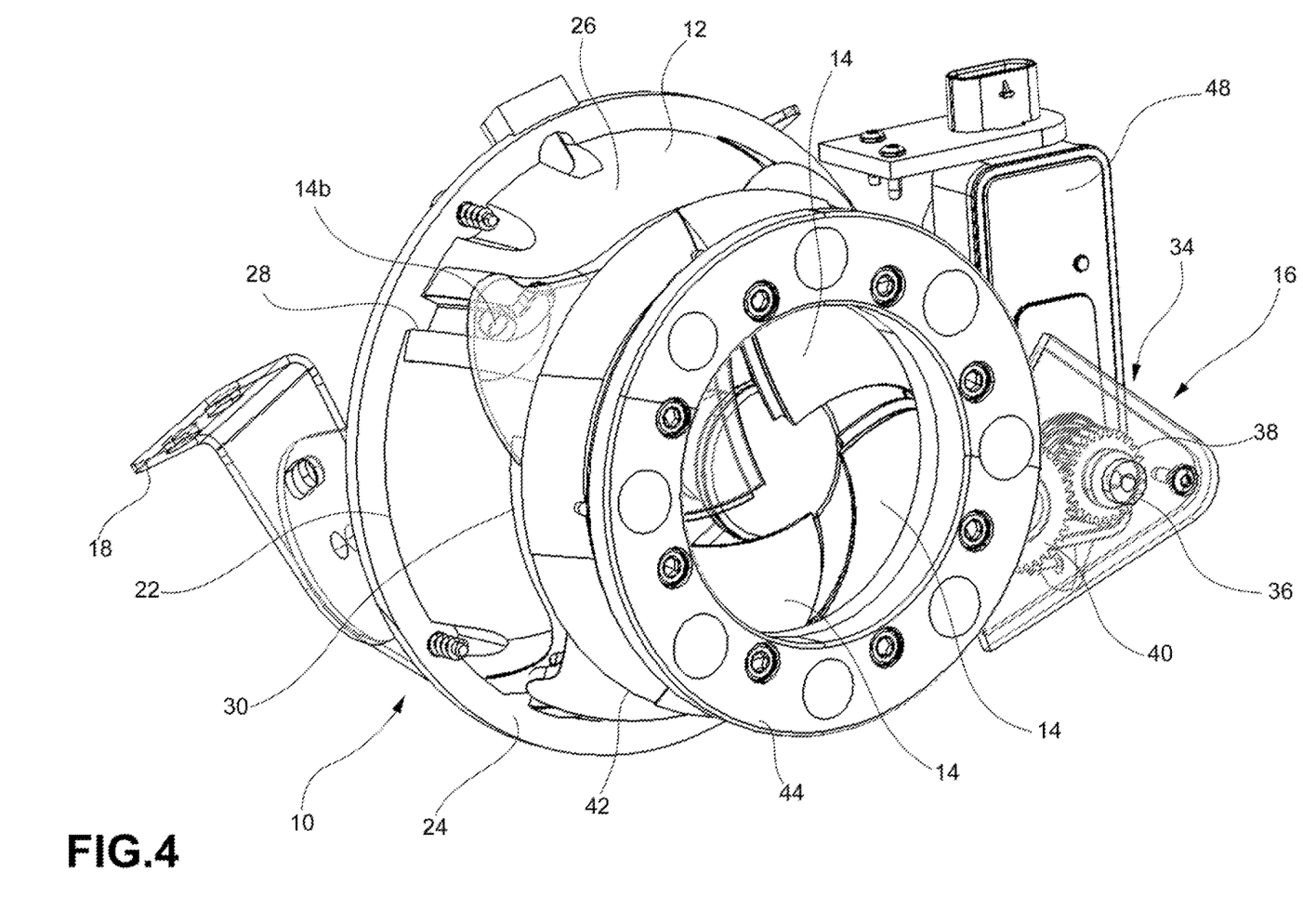
Figure 5:
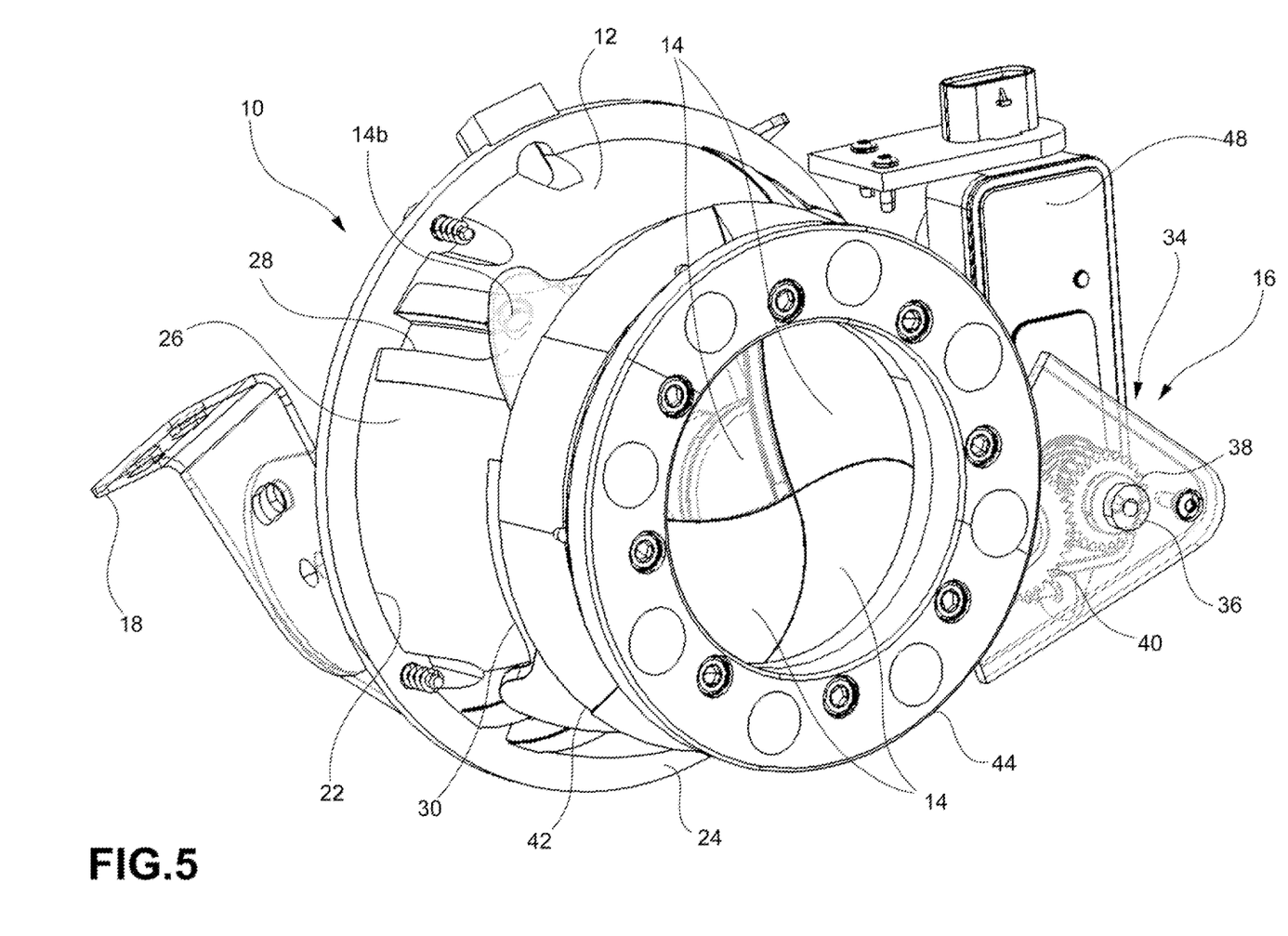
Figure 6:
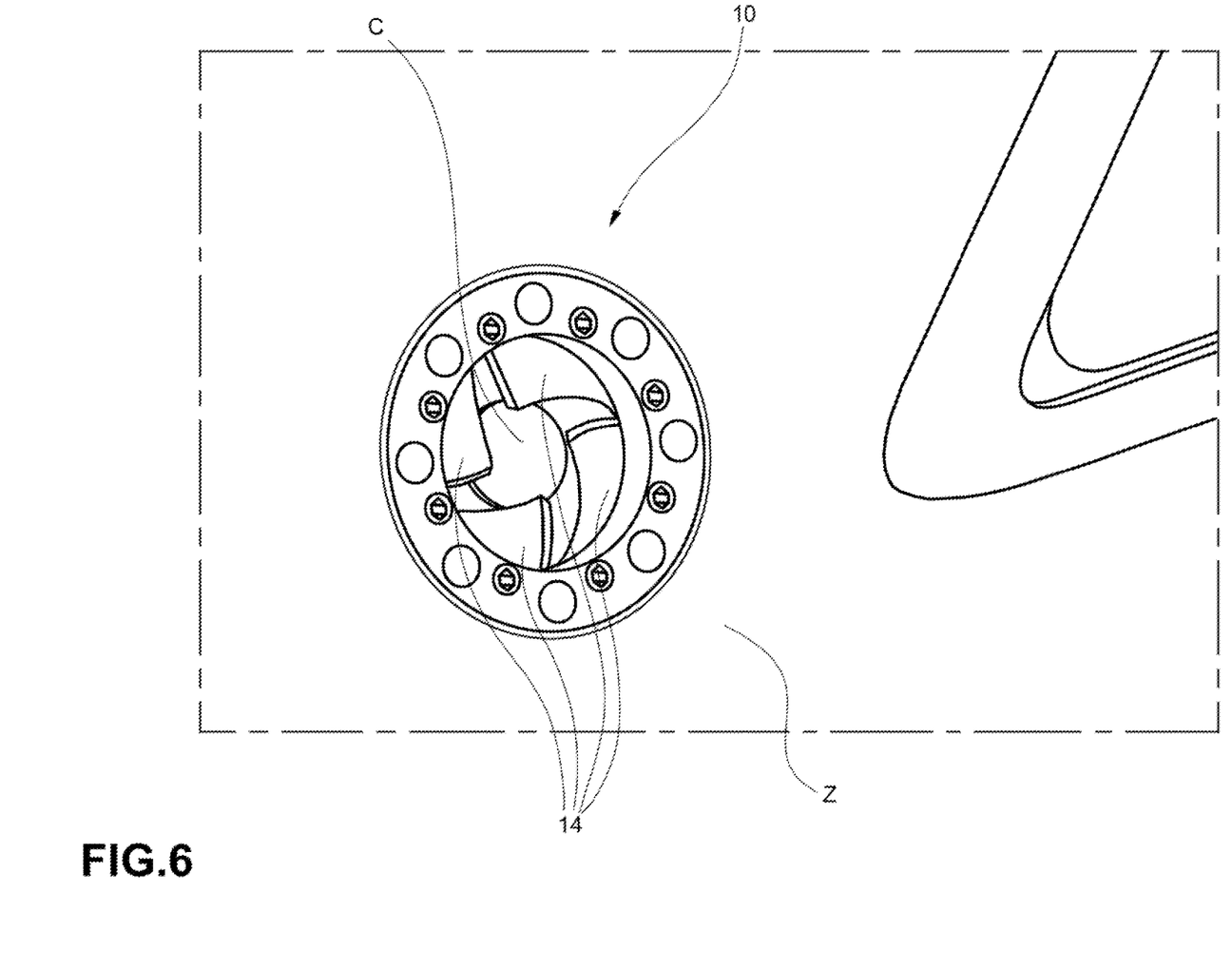
FIG. 6 is a perspective view of the closing system in FIG. 1 mounted on a vehicle body.

The panels 14 are slidably mounted on the frame 12. The panels 14 are curved, and have a shape substantially of a spherical cap portion, i.e., a shape adapted to that of the frame 12, and in particular a shape having three ends joined by curved sides (similar to a curved triangle constructed on an eighth of a sphere; see FIG. 1 in particular). In particular, each panel 14 is constrained at a first end 14a thereof to slide along a respective guide of said first guides 28, and at a second end 14b thereof to slide along a respective guide of said second guides 30. In this way, the panels 14 are slidably mounted on the frame 12 between a first position (i.e., a fully open position, shown in FIG. 2) wherein the panels 14 jointly define an opening 32 which allows access to said supply system T (in the embodiment shown by way of example, in particular, to the refueling line), and a second position (i.e., a fully closed position, shown in FIG. 5) wherein the panels prevent access to said supply system. In the movement between the first position, i.e., the fully open position, and the second position, i.e., the fully closed position, the panels 14 pass through a plurality of intermediate partially open positions, two of which are shown in FIGS. 3 and 4. The shape of the panels 14 and the arrangement and shape of the first guides 28 and of the second guides 30 is such to allow the opening 32 to correspond substantially with the inner area of the first circular section 20 and, in the fully closed position, for the profiles of the panels 14 to fit together so as to prevent access to the supply system T, preferably by closing it fully.

The movement of the panels 14 between the fully open position and the fully closed position, and vice versa, is controlled by the control means 16. In the illustrated embodiment, the control means 16 comprise an electric motor 34. The electric motor 34 is arranged to drive a shaft 36 in rotation therewith; a first gear wheel 38 is mounted on the shaft 36 to rotate together therewith, meshing in turn with a second gear wheel 40. The coupling between the first gear wheel 38 and the second gear wheel 40 defines a transmission ratio as required by the dimensional design specifications. Lastly, the second gear wheel 40 transmits the rotational movement to a rotatable ring 42 having at least one outer gear portion meshing with said second gear wheel 40.

The ring 42 is rotatably mounted on the frame 12 and is connected to the panels 14 to drag them in rotation when thus controlled by the electric motor 34. In particular, the ring 42 is mounted on the frame 12 at the first circular section 20 thereof, and is connected to each panel 14 at the respective first ends 14a.

As shown in the figures, a cover ring 44 may be mounted integral in rotation with the rotatable ring 42 and above it to cover the rotation mechanism and protect it from any foreign bodies. Lastly, a cover frame 46 may be mounted on the frame 12 in such a way to cover the panels 14 and protect their operation with respect to any foreign bodies. Said cover frame 46 may also be connected, by means of shape coupling, to a support assembly 48 adapted to support the electric motor 34 and the transmission mechanism consisting of the first and second gear wheels 38 and 40.

As is clear to a person skilled in the art, the transmission mechanism adapted to transmit the motion imparted by the control means 16 to the panels 14 may also be implemented in an alternative way.

Lastly, the control means 16, in particular the electric motor 34, may be configured for remote control, for example they may be associated with data transmission means, for example wireless, such as short-range radio transmission means, so as to allow control of the opening or closing of the closing system 10 by means of a common remote control, for example a remote control associated with the vehicle keys, or by means of a personal electronic device, such as, for example, a mobile phone, a smartphone and/or a smartwatch.

The operational functioning of the closing system 10 according to the embodiment of the invention shown in the figures will now be briefly described.

Starting from a configuration wherein the closing system 10 is closed (see FIG. 5), i.e., the panels 14 are arranged in a fully closed position as defined above, when it is necessary or desired to refill the tank of the vehicle, a user wishing to have access to the supply system T (in particular, in the embodiment shown by way of example in the figures, to the refueling line) may control the control means 16, and in particular the electric motor 34. This control may be imparted through a vehicle control unit configured to transmit this control following the manual control of a button arranged on the vehicle's dashboard, or through an electronic control, for example via remote control or smartphone, as described above. When the electric motor 34 is activated, it rotates the shaft 36 connected thereto, the first gear wheel 38, and the second gear wheel 40. In turn, the second gear wheel 40 transmits the rotary motion to the rotatable ring 42, which, being connected to the first ends 14a of the panels 14, drags the curved panels 14 of the diaphragm mechanism. In this way, the panels 14 are moved between the fully open position (see FIG. 5) and the fully closed position (see FIG. 2), passing through a plurality of partially open positions (see FIGS. 4 and 3). Clearly, depending on the movement required (closing movement or opening movement), the electric motor 34 may control the rotation of the rotatable ring 42 in one direction or in the opposite direction, and therefore the movement of the closing system 10 may be represented consecutively by FIGS. 2 to 5 (when the closing system 10 is closing) or, in reverse order, by FIGS. 5 to 2 (when the closing system 10 is opening).

As is clear from the above description, the closing system according to the invention has several advantages.

Firstly, by virtue of the three-dimensional configuration and movement along an essentially hemispherical frame, the size of the closing system is reduced with respect to the prior art. In this way, it is possible to use the space around the closing system in another way, or, similarly, it is possible to position the supply system and the closing system associated therewith closer to other elements of the vehicle body (such as a rear window or a handle for a rear door of the vehicle, for example), thus loosening the dimensional design constraints.

Furthermore, by virtue of the presence of the control means, the closing system may be actuated, for example electrically, and controlled, for example by means of a wireless electronic device such as a remote control.

Naturally, without prejudice to the principle of the invention, the embodiments and the details of construction may be widely varied with respect to that which has been described and illustrated purely by way of non-limiting example, without thereby departing from the scope of the invention defined in the appended claims.

The invention claimed is:

1. A closing system for allowing or limiting access to a supply system of a vehicle, the closing system comprising:
    a frame, configured to be mounted on a body of the vehicle in correspondence with the supply system, the frame being shaped as a spherical segment, extending between a first circular section and a second circular section and comprising a plurality of first guides and a plurality of second guides, arranged on a radially outer surface;
    a plurality of curved panels, each curved panel of said plurality of curved panels being essentially shaped as a part of a spherical cap and constrained, at a first end, to slide along a respective first guide of said plurality of first guides and, at a second end, to slide along a respective second guide of said plurality of second guides between a first position, in which said curved panels jointly define an opening that allows access to said supply system, and a second position, in which said curved panels prevent access to the supply system; and
    control means for controlling movement of said plurality of curved panels between said first position and said second position.

2. The closing system of claim 1, wherein the control means comprise an electric motor.

3. The closing system of claim 1, further comprising a rotatable ring arranged at said first circular section of the frame and coaxial with the first circular section, said rotatable ring being connected to each curved panel at respective first ends to drag said curved panels in rotation.

4. The closing system of claim 2, wherein the control means comprise an electric motor, and wherein said electric motor is coupled with the rotatable ring to drive the rotatable ring in rotation to move the plurality of curved panels between said first position and said second position.

5. The closing system of claim 4, further comprising a gear wheel transmission mechanism interposed between said rotatable ring and said electric motor.

6. The closing system of claim 1, wherein said opening, said first circular section and said second circular section are coaxial with each other.

7. The closing system of claim 1, wherein each first guide of said plurality of first guides extends on the outer surface of the frame along an arc of a circle that is concentric with said first circular section and with said second circular section, and wherein each second guide of said plurality of second guides extends on the outer surface of the frame with a shape of a rounded L.

8. The closing system of claim 1, wherein the first guides of the plurality of first guides are arranged angularly evenly spaced from each other and wherein the second guides of the plurality of second guides are arranged angularly evenly spaced from each other.

9. The closing system of claim 1, wherein said control means are configured to be remotely controlled by a remote control or a personal electronic device.

10. The closing system of claim 9, wherein said personal electronic device is one of a cell phone, a smartphone, a smartwatch.

11. A vehicle comprising a closing system according to claim 1 and a supply system comprising a refueling pipe for fuel.

12. A vehicle comprising a closing system according to claim 1 and a supply system comprising an electrical connector for charging a battery of the vehicle.

* * * * *